(12) United States Patent
Wu et al.

(10) Patent No.: US 6,566,640 B2
(45) Date of Patent: May 20, 2003

(54) SYSTEM AND METHOD FOR AUTONOMOUS CORRECTION OF STAR TRACKER HIGH SPATIAL FREQUENCY (HSF) ERROR

(75) Inventors: Yeong-Wei Wu, Rancho Palos Verdes, CA (US); Rongsheng Li, Hacienda Heights, CA (US)

(73) Assignee: The Boeing Company, Chicago, IL (US)

( * ) Notice: Subject to any disclaimer, the term of this patent is extended or adjusted under 35 U.S.C. 154(b) by 23 days.

(21) Appl. No.: 09/961,704

(22) Filed: Sep. 24, 2001

(65) Prior Publication Data

US 2003/0057354 A1 Mar. 27, 2003

(51) Int. Cl.$^7$ .................................................. G01J 1/20
(52) U.S. Cl. ...................... 250/203.1; 244/171; 701/13; 701/222
(58) Field of Search ............................ 250/203.1, 203.3, 250/203.4, 203.6; 244/164, 171, 158 R; 701/13, 222, 226; 356/139.01

(56) References Cited

U.S. PATENT DOCUMENTS 4,944,587 A * 7/1990 Harigae ................. 356/139.01

* cited by examiner

Primary Examiner—David Porta
Assistant Examiner—Stephen Yam
(74) Attorney, Agent, or Firm—Gates & Cooper LLP

(57) ABSTRACT

A method and apparatus for post processing a star tracker measurement to remove a systematic error characterizable at least in part by a pixel phase is disclosed. The method comprises the steps of computing the pixel phase along a first axis from a measured star position and a star tracker characteristic, computing a first axis error correction according to the computed pixel phase, and computing a compensated first axis star tracker measurement according to the measured star position and the first axis error correction.

33 Claims, 10 Drawing Sheets

SYSTEM AND METHOD FOR AUTONOMOUS CORRECTION OF STAR TRACKER HIGH SPATIAL FREQUENCY (HSF) ERROR

STATEMENT OF RIGHTS OWNED

This invention was made with Government support under contract. The government has certain rights in this invention.

BACKGROUND OF THE INVENTION

1. Field of the Invention

This invention relates generally to spacecraft attitude determination and control systems, more particularly, to a method and apparatus for correcting star tracker high spatial frequency (HSF) error to improve-attitude determination performance in stellar inertial attitude determination systems.

2. Description of the Related Art

Satellite navigation systems typically include an attitude determination and control system. In such systems, the spacecraft inertial attitude is determined continuously in the spacecraft control processor (SCP) by numerically propagating the measured spacecraft inertial rates provided by three orthogonal gyros. Periodically, star data (star positions, star magnitudes, and their time tags) provided by the star trackers are then used to correct the attitude errors caused by gyro bias and gyro angle random walk during attitude propagation. The resulting attitude determination performance depends heavily on star tracker performance in terms of its measured star position accuracy.

Star trackers measure the positions of stars in the star tracker field-of-view (FOV). Several types of errors typically corrupt star tracker position measurements, thereby resulting in attitude determination errors. These star tracker errors can be generally attributed to temporal noise (that changes over time), high spatial frequency error that changes rapidly as stars move across the FOV, and low spatial frequency (LSF) error that changes slowly as stars move across FOV.

What is needed is a system and method for reducing spatial errors that degrade attitude determination and control systems. The present invention satisfies that need by post-processing the star data so that systematic HSF error can be removed without a need for real time control of star tracker boresight orientation.

SUMMARY OF THE INVENTION

To address the requirements described above, the present invention discloses a method and apparatus for post processing a star tracker measurement to remove a systematic error characterizable at least in part by a pixel phase. The method comprises the steps of computing the pixel phase along a first axis from a measured star position and a star tracker characteristic, computing a first axis error correction according to the computed pixel phase, and computing a compensated first axis star tracker measurement according to the measured star position and the first axis error correction. The apparatus comprises a first module, communicatively coupled to a star tracker, the first module configured to compute the pixel phase along a first axis from a measured star position and a star tracker characteristic a second module communicatively coupled to the first module, the second module configured to compute a first axis error correction according to the computed pixel phase, and a third module communicatively coupled to the second module, the third module configured to compute a compensated first axis star tracker measurement according to the measured star position and the first axis error correction.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Attitude Control Systems

Figure 1:
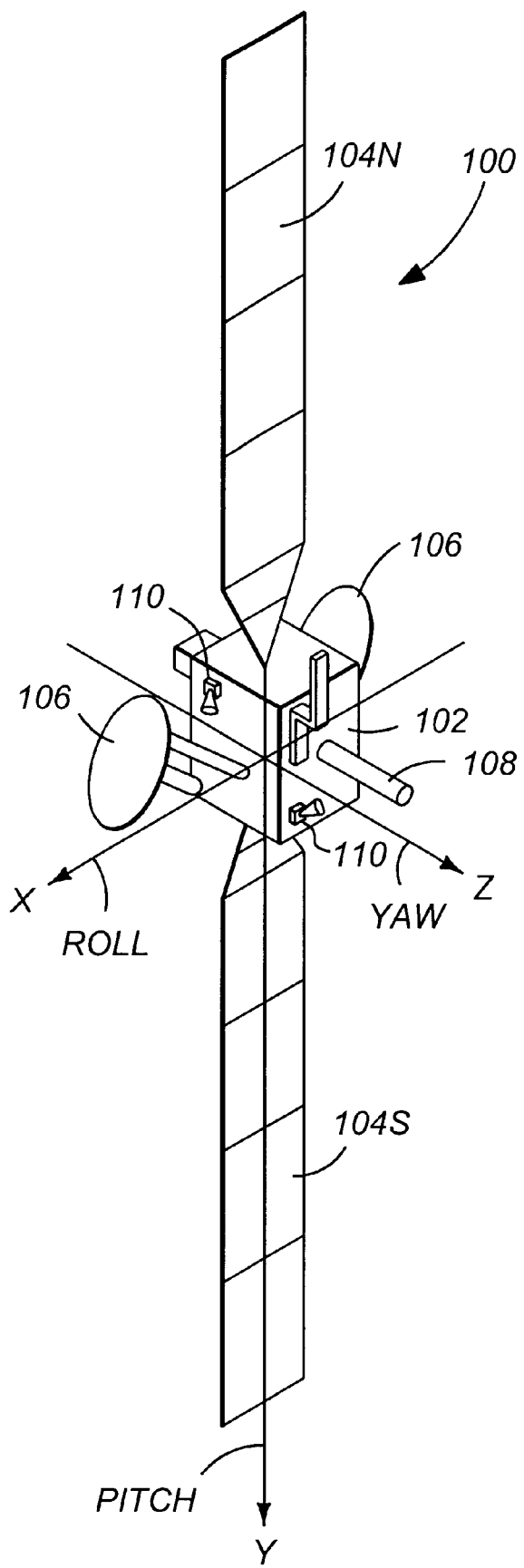
FIG. 1 illustrates a three-axis stabilized satellite or spacecraft.

FIG. 1 illustrates a three-axis stabilized satellite or spacecraft 100. The spacecraft 100 is preferably situated in a stationary orbit about the Earth. The satellite 100 has a main body 102, a pair of solar panels 104, a pair of high gain narrow beam antennas 106, and a telemetry and command omni-directional antenna 108 which is aimed at a control ground station. The satellite 100 may also include one or more sensors 110 to measure the attitude of the satellite 100. These sensors may include sun sensors, earth sensors, and star sensors. Since the solar panels are often referred to by the designations "North" and "South", the solar panels in FIG. 1 are referred to by the numerals 104N and 104S for the "North" and "South" solar panels, respectively.

The three axes of the spacecraft 10 are shown in FIG. 1. The pitch axis P lies along the plane of the solar panels 140N and 140S. The roll axis R and yaw axis Y are perpendicular to the pitch axis P and lie in the directions and planes shown. The antenna 108 points to the Earth along the yaw axis Y.

Figure 2:
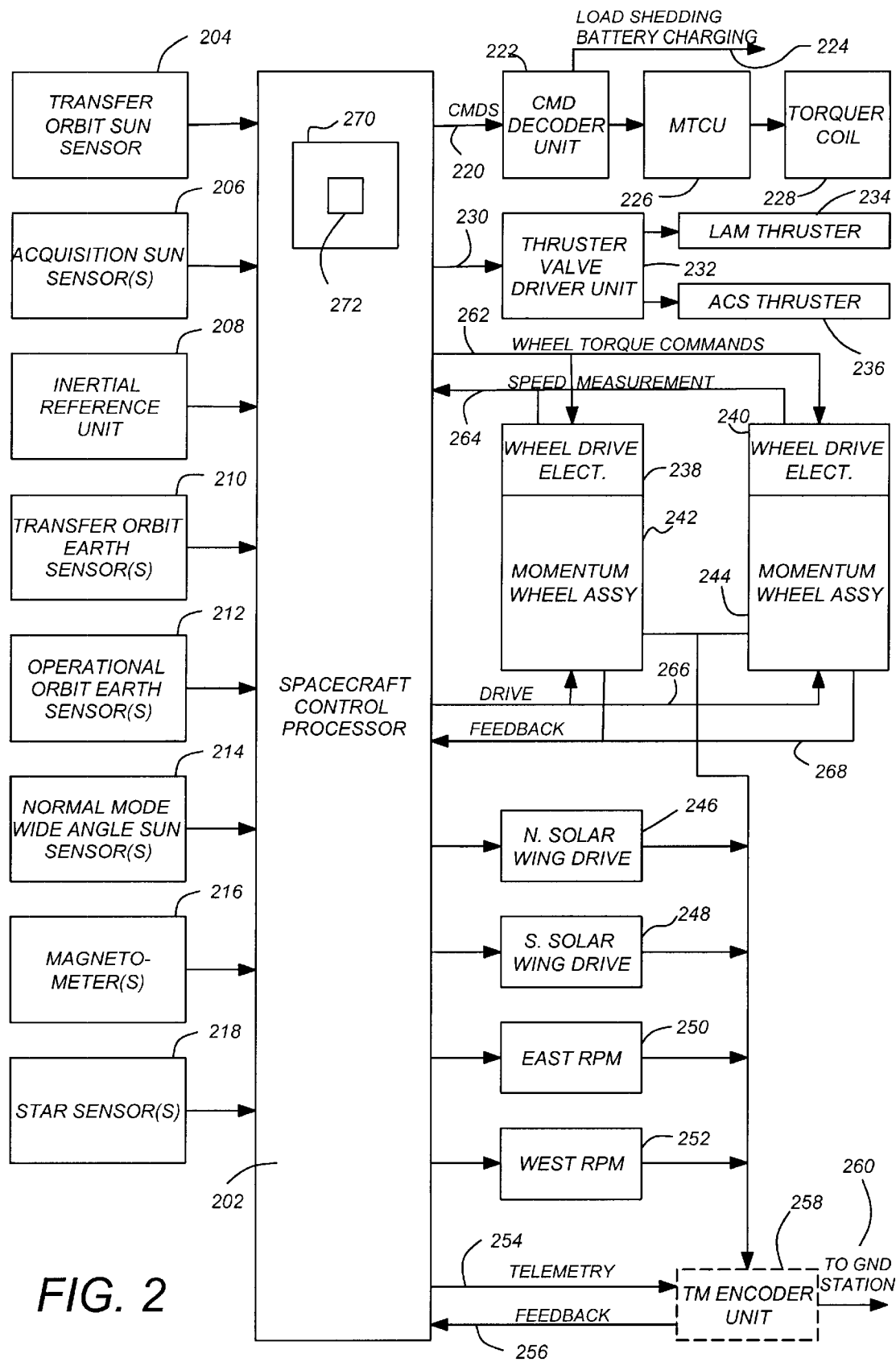
FIG. 2 is a diagram depicting the functional architecture of a representative attitude control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, stationkeeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The stationkeeping control could include auto mode sequencing, gyro calibration, stationkeeping attitude control and transition to normal. The normal mode control could include attitude estimation, attitude and solar array steering, momentum bias control, magnetic torquing, and thruster momentum dumping (H-dumping). The mechanism's mode control could include solar panel control and reflector positioning control. The spacecraft control systems support could include tracking and command processing, battery charge management and pressure transducer processing.

Input to the spacecraft control processor 202 may come from a any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220 which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel torque commands 262 are generated by the SCP 202 and are communicated to the wheel speed electronics 238 and 240. These effect changes in the wheel speeds for wheels in momentum wheel assemblies 242 and 244, respectively. The speed of the wheels is also measured and fed back to the SCP 202 by feedback control signal 264.

The spacecraft control processor also sends jackscrew drive signals 266 to the momentum wheel assemblies 243 and 244. These signals control the operation of the jackscrews individually and thus the amount of tilt of the momentum wheels. The position of the jackscrews is then fed back through command signal 268 to the spacecraft control processor. The signals 268 are also sent to the telemetry encoder unit 258 and in turn to the ground station 260.

The spacecraft control processor also sends command signals 254 to the telemetry encoder unit 258 which in turn sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The wheel drive electronics 238, 240 receive signals from the SCP 202 and control the rotational speed of the momentum wheels. The jackscrew drive signals 266 adjust the orientation of the angular momentum vector of the momentum wheels. This accommodates varying degrees of attitude steering agility and accommodates movement of the spacecraft as required.

The use of reaction wheels or equivalent internal torquers to control a momentum bias stabilized spacecraft allows inversion about yaw of the attitude at will without change to the attitude control. In this sense, the canting of the momentum wheel is entirely equivalent to the use of reaction wheels.

Other spacecraft employing external torquers, chemical or electric thrusters, magnetic torquers, solar pressure, etc. cannot be inverted without changing the control or reversing the wheel spin direction. This includes momentum bias spacecraft that attempt to maintain the spacecraft body fixed and steer payload elements with payload gimbals.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 10 may also comprise an external communication device such as a satellite link for communicating with other computers at, for example, a ground station. If necessary, operation instructions for new applications can be uploaded from ground stations.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 10 or on the ground), thereby making a computer program product or article of manufacture according to the invention. As such, the terms "program storage device," "article of manufacture" and "computer program product" as used herein are intended to encompass a computer program accessible from any computer readable device or media.

Attitude Determination System

Figure 3:
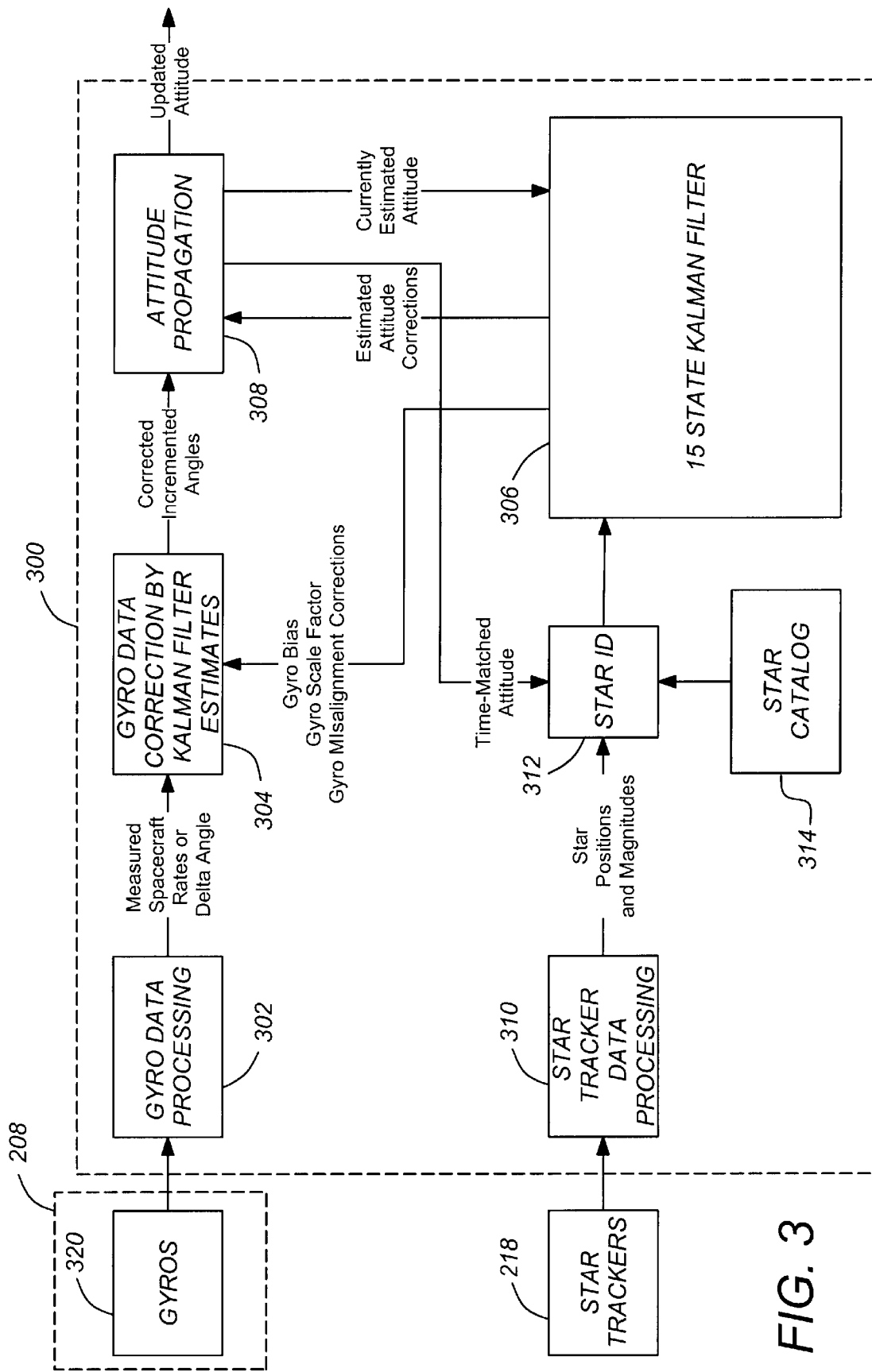
FIG. 3 is a block diagram of an attitude determination system.

FIG. 3 is a block diagram of an attitude determination system 300. The attitude determination system 300 is communicatively coupled to the rate sensors (e.g. gyros) 320 and star trackers 218. The gyros (which are typically part of the inertial reference unit 208) provide measurements of the rotation rate of the satellite 100. Typically, such measurements are taken in three separate orthogonal axes by three different instruments. Often, the gyros are integrated with accelerometers to comprise the inertial reference unit 208.

The attitude determination system 300 includes a gyro data processor 302 communicatively coupled to the gyro(s) 320 to receive satellite rotation rate data. The gyro data processor processes the raw spacecraft rotation rate measurement data to provide processed rate data or changes in spacecraft attitude (delta angles). This data is provided to a gyro data correction module 304. The gyro data correction module 304 further processes the spacecraft rotation rate data to account for gyro biases, gyro scale factors, and gyro misalignments. The estimates of the gyro biases, gyro scale factors, and gyro misalignments are provided by a Kalman filter 306.

The attitude determination system 300 also includes an attitude propagation module 308 communicatively coupled to the gyro data correction module 304. The attitude propagation module 308 accepts corrected gyro data from the gyro data correction module 304 as well as estimated attitude corrections from the Kalman filter 306, and generates an updated attitude estimate.

The Kalman filter generates the foregoing estimates from information provided by the attitude propagation module 308 (which provides data ultimately derived primarily from the gyro 320 data) and a star identification module 312 (which provides attitude data derived from the star trackers 218). The star identification module 312 provides the star measurement residuals, which are the differences between the measured star positions from the star tracker 218 and star tracker data processor(s) 310, and the predicted star positions based on the time-matched attitude and the information in the star catalog 314.

While the foregoing attitude determination system can provide reasonably good estimates of spacecraft 100 attitude, star tracker errors can degrade performance. Temporal star tracker measurement noise is typically uncorrelated over time and can be heavily attenuated using the Kalman filter. LSF errors are typically caused by non-ideal star tracker characteristics such as optical deformation, effective focal length variation and charge transfer efficiency degradation over life, and can also be compensated for.

HSF errors have two major contributors: systematic HSF error and random HSF error. Systematic HSF error is a result of applying centroiding algorithm using a finite sampling of geometry, and the random HSF error is caused by the CCD pixel-to-pixel non-uniformity and CCD read out noise. Although random HSF error can be attenuated by a Kalman filter (in the manner of temporal noise), systematic HSF error may not.

Figure 4:
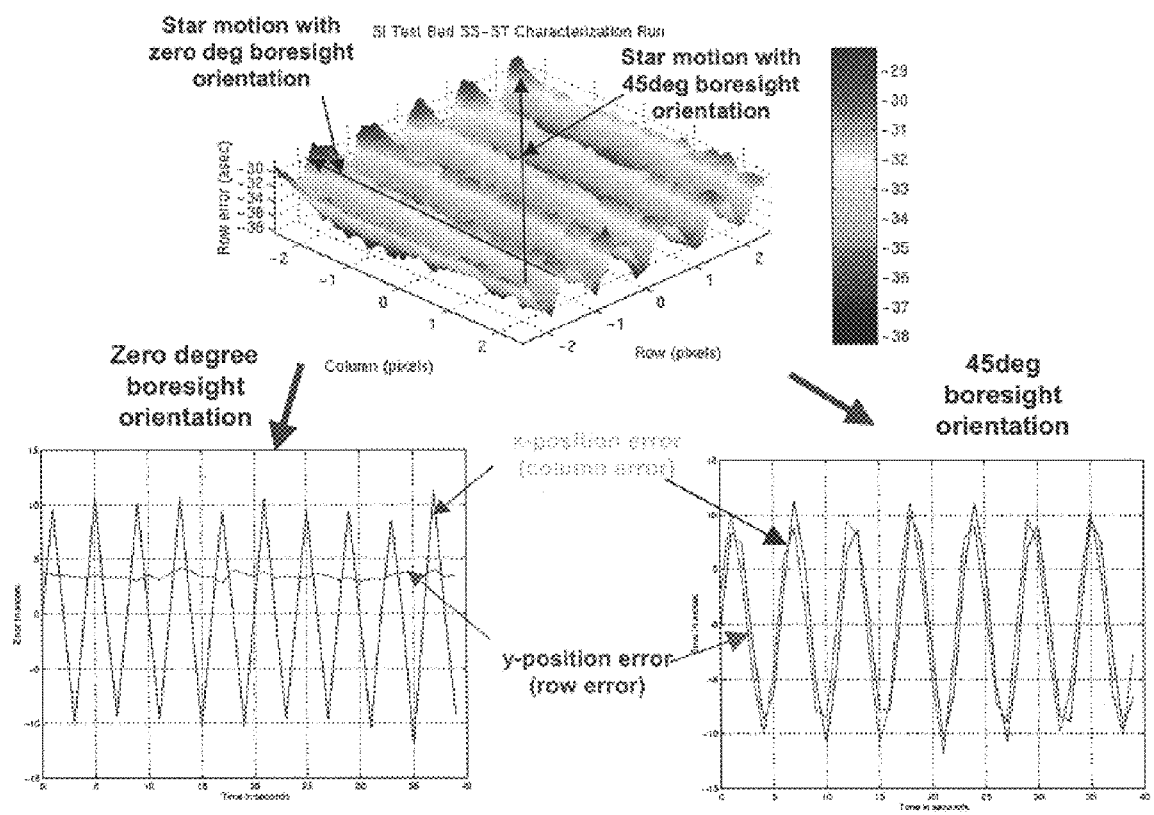
FIG. 4 is a plot showing how systematic HSF errors can become low temporal frequency errors that can not be readily attenuated by Kalman filtering techniques.

FIG. 4 is a diagram showing how systematic HSF error can become low temporal frequency error that cannot be attenuated by a Kalman filter. It is possible to orient the star tracker's boresight so that star tracker high spatial frequency errors can be attenuated by the Kalman filter. However, such methods typically require that the star tracker boresight orientation be controlled in such a way that the tracked stars move near diagonally across the star tracker FOV in order to attenuate the systematic HSF error. For GEO satellites, this near diagonal star motion can be achieved with a fixed star tracker boresight orientation. However, for other types of orbits, such as LEO orbit, HEO orbit, MEO orbit, or agile spacecraft missions, a complicated control for star tracker boresight orientation is needed to obtain near diagonal star motions.

Many CCD-based star trackers purposely defocus the star image so that a star will occupy several pixels. A sub-pixel resolution can be obtained in determining the star center position from the defocused image.

Figure 5:
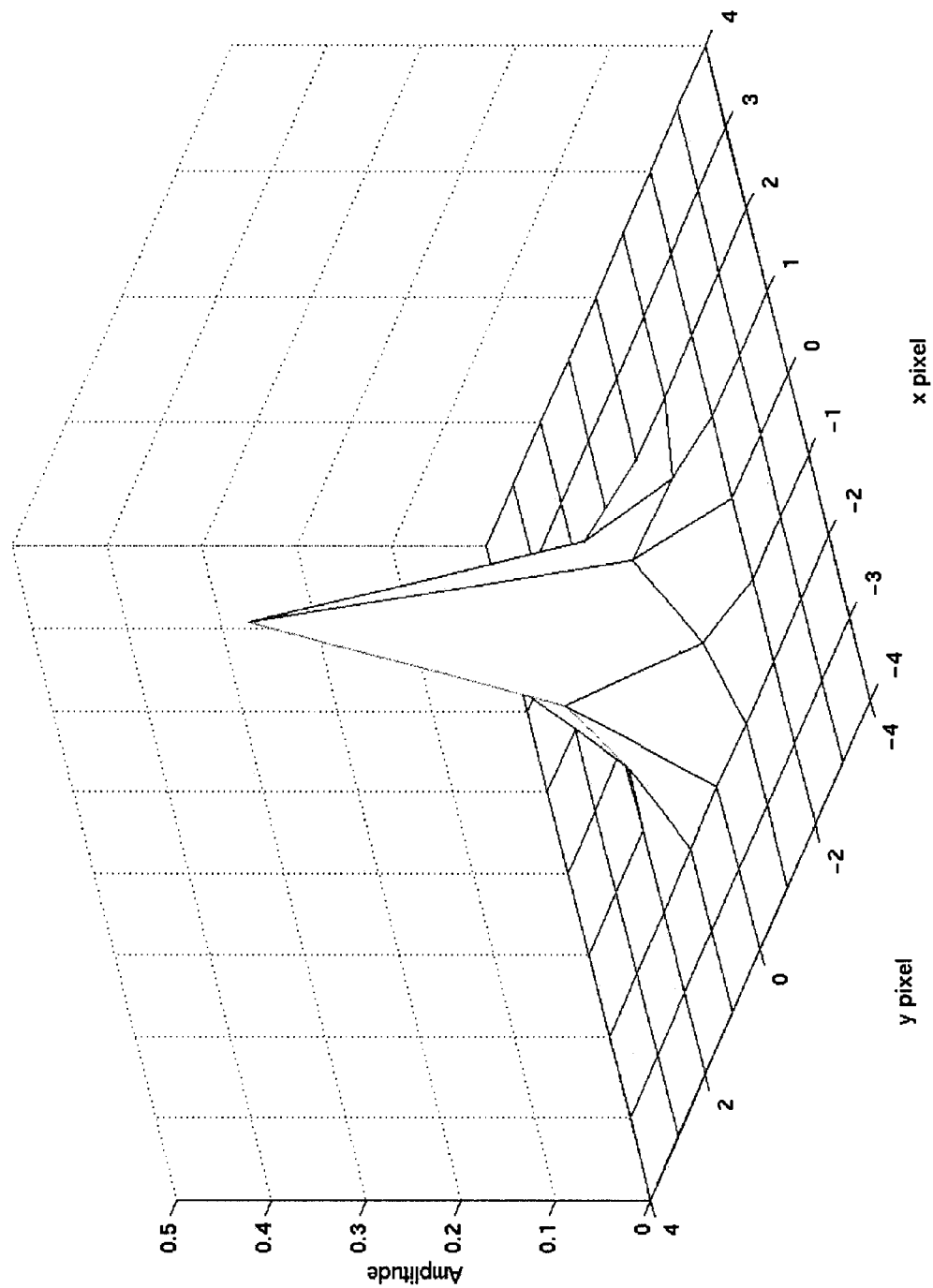
FIG. 5 is a diagram showing a defocused star image on an array of CCD pixels.

FIG. 5 is a diagram showing a defocused star image on an array of CCD pixels. In the illustrated example, the pixel standard deviation is $\sigma_x = \sigma_y = 0.5$ pixel, the first axis boresight is $x_0 = -0.1$ pixels and the first axis boresight $y_0 = 0.1$ pixels.

A star image can be described by a the point spread function (PSF), $$PSF(x, y, x_0, y_0) =$$
$$PSF(x, x_0)PSF(y, y_0) = \frac{1}{\sqrt{2\pi}\,\sigma_x} e^{-\frac{1}{2}\left(\frac{x-x_0}{\sigma_x}\right)^2} \frac{1}{\sqrt{2\pi}\,\sigma_y} e^{-\frac{1}{2}\left(\frac{y-y_0}{\sigma_y}\right)^2}$$

wherein x is a first axis, y is a second axis, $x_0$ is the star image center location along the first axis and $y_0$ is the star image center location along the second axis. Given this formulation of the star image, the energy or amplitude each star tracker CCD pixel received can be expressed as:

$$AMP(m, n, x_0, y_0) =$$
$$\left\{\int_{m-0.5}^{m+0.5} \frac{1}{\sqrt{2\pi}\,\sigma_x} e^{-\frac{1}{2}\left(\frac{x-x_0}{\sigma_x}\right)^2} dx\right\} \left\{\int_{n-0.5}^{n+0.5} \frac{1}{\sqrt{2\pi}\,\sigma_y} e^{-\frac{1}{2}\left(\frac{y-y_0}{\sigma_y}\right)^2} dy\right\}$$

m and n are integers.

Using the received amplitudes from pixels, the star image center location can be estimated or computed as follows:

$$\hat{x}_0 = \frac{\sum_n \sum_m m * AMP(m, n, x_0, y_0)}{\sum_m \sum_n AMP(m, n, x_0, y_0)} \text{ and}$$

$$\hat{y}_0 = \frac{\sum_m \sum_n n * AMP(m, n, x_0, y_0)}{\sum_m \sum_n AMP(m, n, x_0, y_0)}$$

Figure 6:
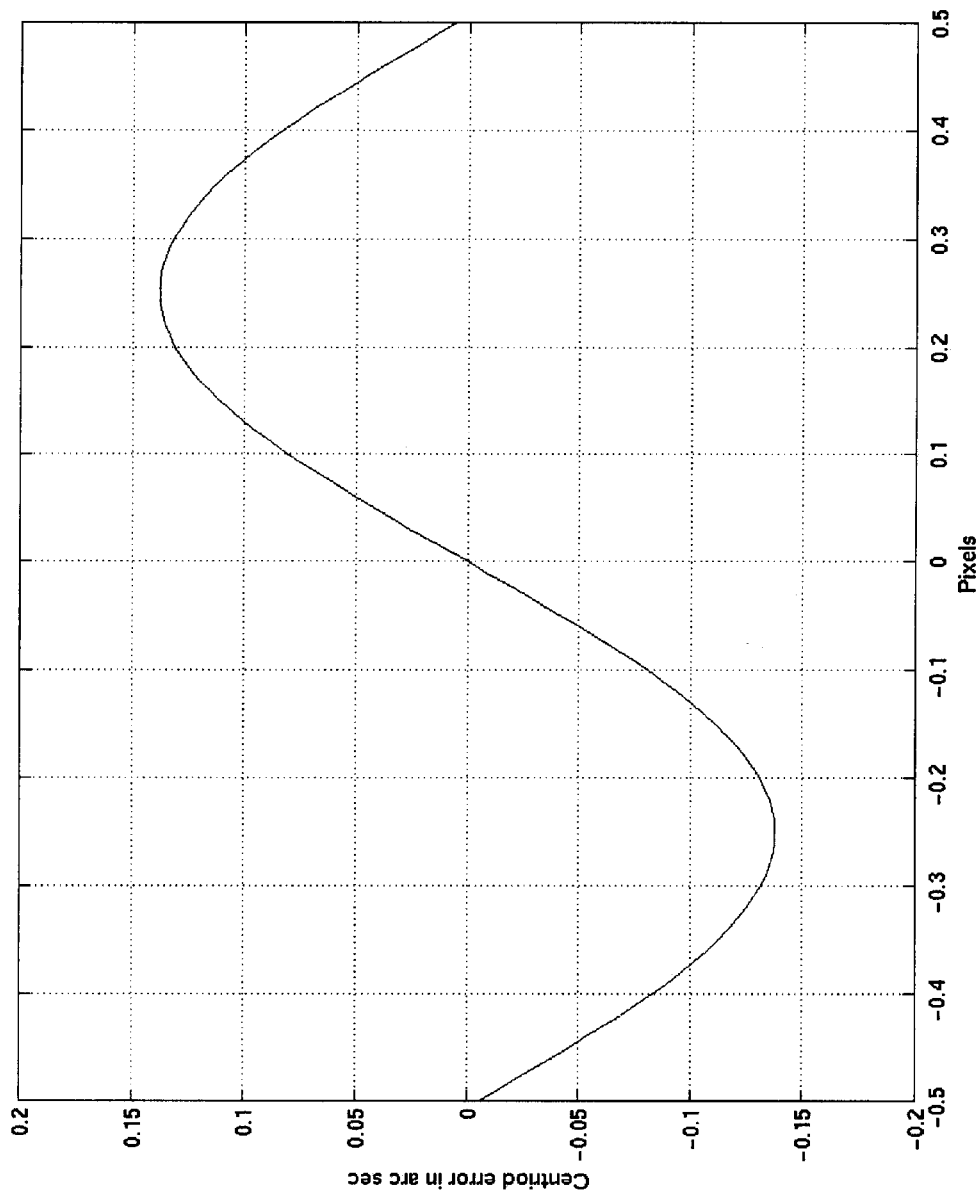
FIG. 6 is a diagram showing centroiding error without CCD pixel noise.

Without CCD pixel noise, the centroiding error, defined as: $x_0 - \hat{x}_0$ or $y_0 - \hat{y}_0$, can be well characterized as shown in FIG. 6 as a function of pixel phasing.

Figure 7:
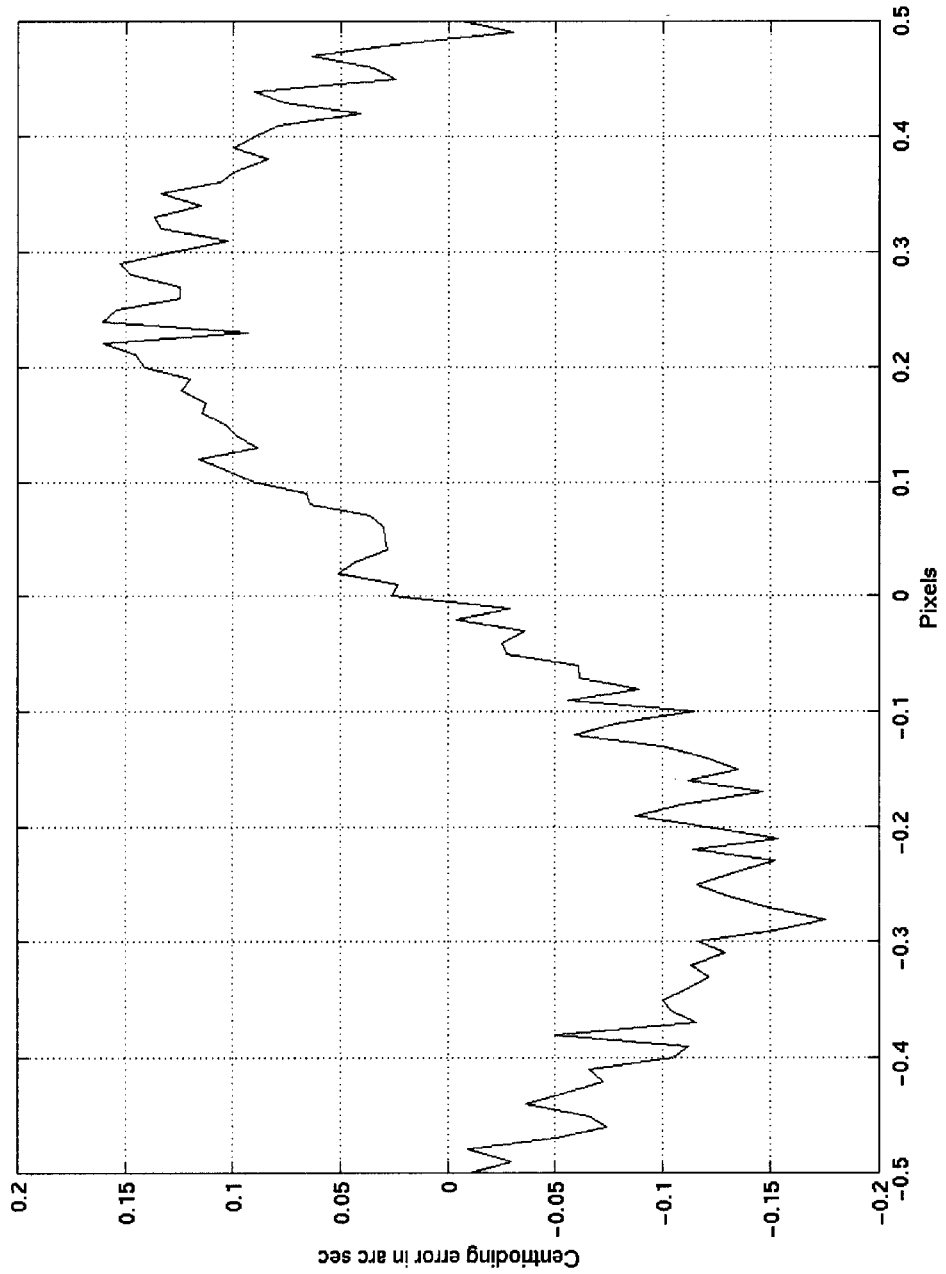
FIG. 7 is a diagram showing centroiding error with CCD pixel noise.

FIG. 7 is a diagram showing centroiding error with CCD pixel noise. The existence of this systematic HSF error called "S-curve" is further evident from the actual star tracker test data as shown by FIG. 4. Because of this well-characterizable HSF error, star tracker 218 data can be processed to remove the systematic HSF error to improve the performance of the stellar inertial attitude determination. This processing can occur in parallel with other star measurement processes, or the data may be simply post processed.

Figure 8:
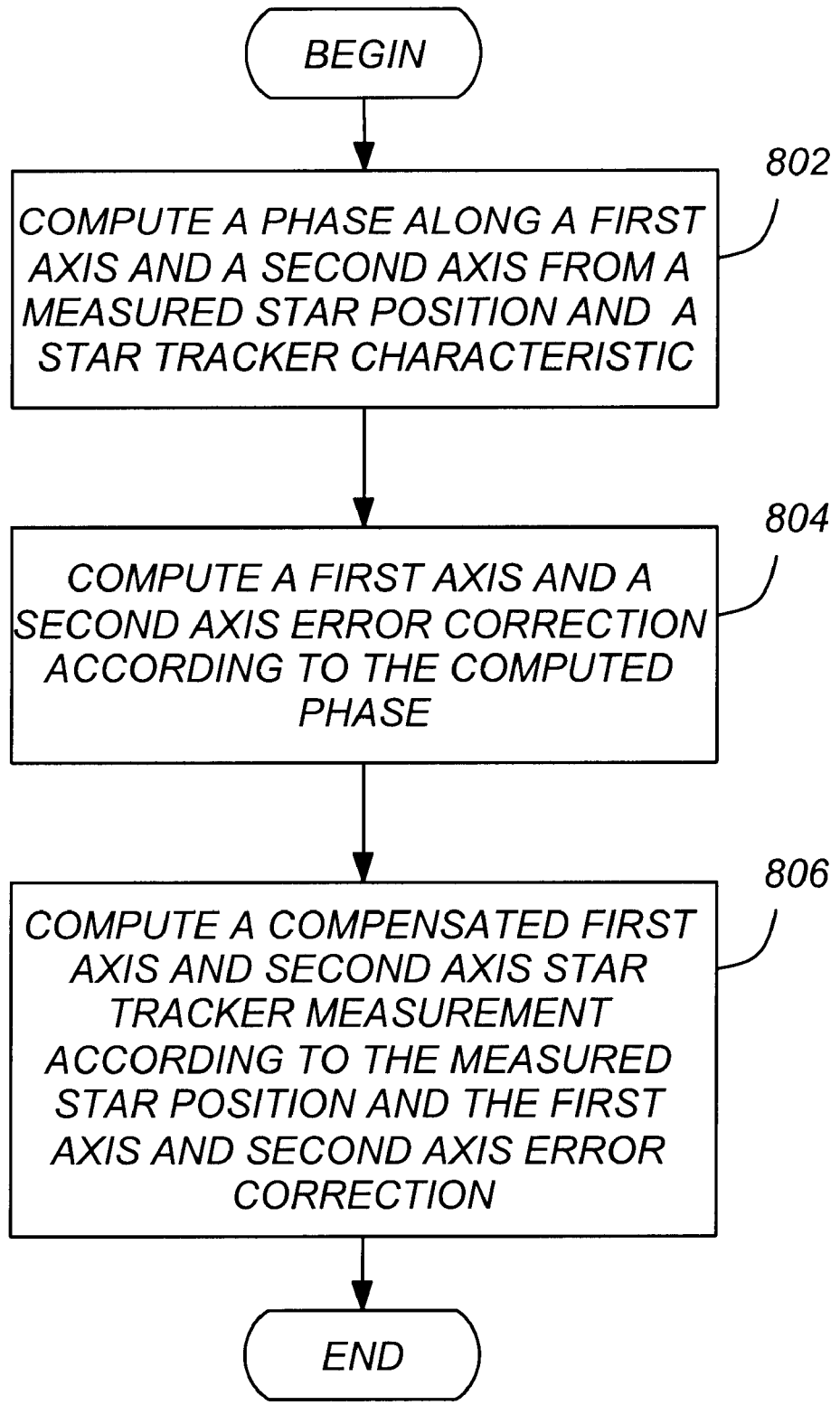
FIG. 8 is a flow chart presenting illustrative method steps used to practice one embodiment of the present invention.

FIG. 8 is a flow chart presenting illustrative method steps used to practice one embodiment of the present invention. First, a pixel phase along a first axis and a second axis. The pixel phase can be computed according to the following relations $$\phi_x = \frac{x_{meas}}{d_x} - rnd\left(\frac{x_{meas}}{d_x}\right) \text{ and}$$

$$\phi_y = \frac{y_{meas}}{d_y} - rnd\left(\frac{y_{meas}}{d_y}\right)$$

wherein $\phi_x$ is the x-pixel phasing, $\phi_y$ is the y-pixel phasing, $x_{meas}$ is the star tracker measured star center position in radians, and $d_x$ and $d_y$ are star tracker pixel widths in radians in x direction and y direction respectively, and rnd(•) represents an operator that rounds up the number in the parenthesis to the nearest integer. This is illustrated in block 802.

A first axis and second axis error correction is then computed using the pixel phase computed in block 802. This can be computed according to the following relations $$x_{correction} = a_x \sin(2\pi\phi_x); \text{ and}$$

$$y_{correction} = a_y \sin(2\pi\phi_y)$$

wherein $a_x$ and $a_y$ are amplitude values. In one embodiment, $a_x$ and $a_y$ are pre-determined constants. Further, $a_x$ and $a_y$ may be selected as a function of the star magnitude (as measured or determined from the star catalog). This operation is shown in block 804.

A compensated first axis and second axis star tracker measurement is then computed according to the measured star position and the first and second axis error corrections described above. This can be accomplished using the following relations $$x_{comp} = x_{meas} - x_{correction} \text{ and}$$

$$y_{comp} = y_{meas} - y_{correction}.$$

Figure 9:
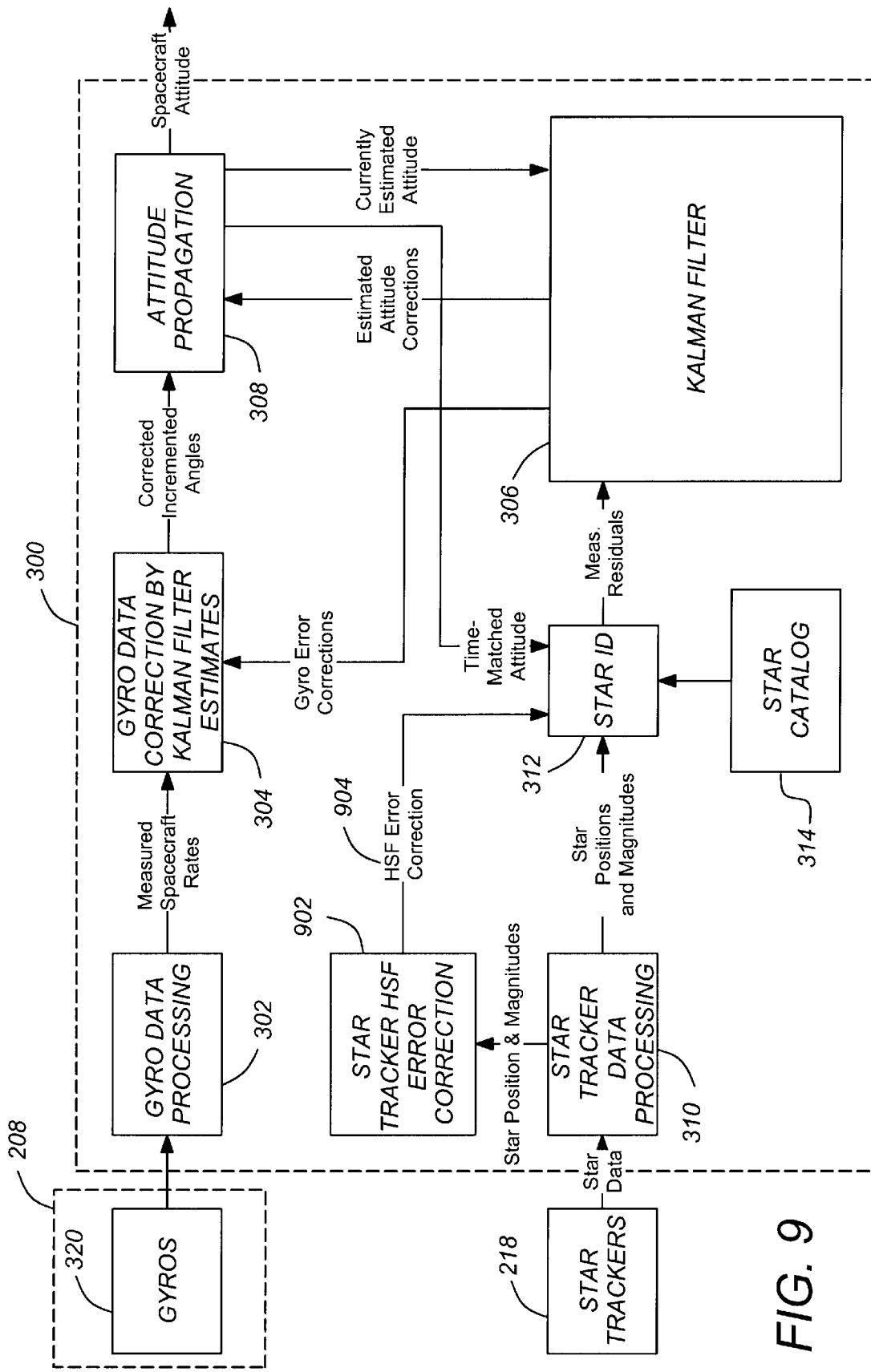
FIG. 9 is a block diagram one embodiment of the present invention as applied to a stellar inertial attitude determination system.

FIG. 9 is a block diagram of the present invention as applied to a stellar inertial attitude determination system. The inertial attitude determination system comprises an error correction module 902 that accepts information from the star tracker data processing module 310, and produces an error correction signal. The star tracker HSF error correction module 902 receives the uncorrected star x position and y position and produces the corrected star x position and y position according to the above-described invention. The corrected star x position and y position are then used in the star ID module 312 to generate the measurement residuals to be used in the Kalman filter 306, which produces the attitude correction as well as gyro error correction. Because the present invention removes virtually all star tracker systematic HSF error, the attitude determination will be greatly improved regardless the star motion directions.

Figure 10:
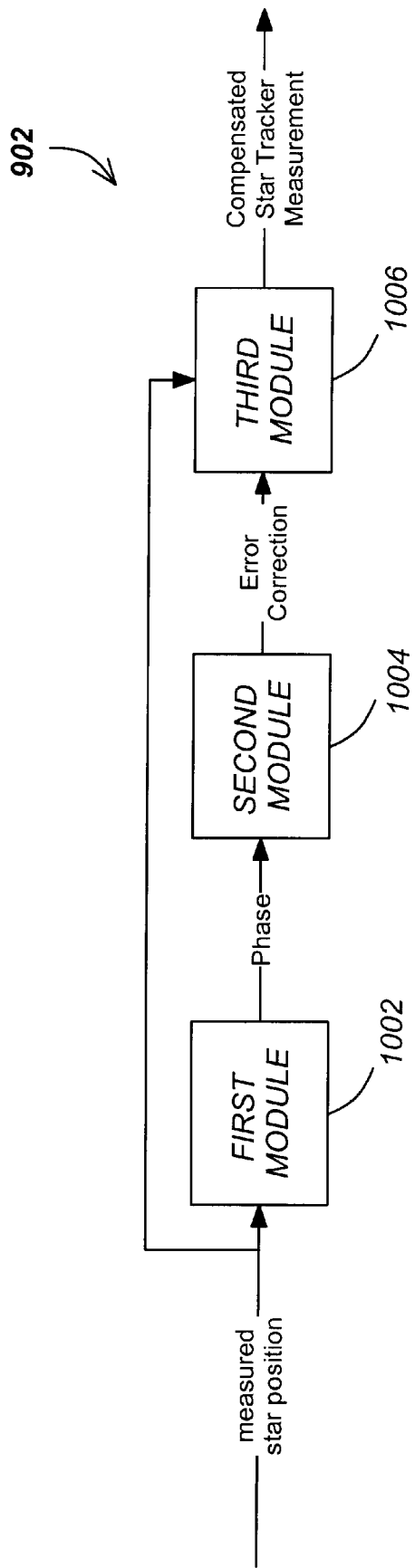
FIG. 10 presents a block diagram of an embodiment of the invention showing separate modules for implementing the present invention.

FIG. 10 presents a block diagram of an embodiment of the invention showing separate modules for performing the computations described above. The error correction module 902 includes a first module 1002 configured to compute a pixel phase along a first axis and a second axis from a measure star position and a star tracker characteristic such as pixel size. The first module 1002 is communicatively coupled to a second module 1004 configured to compute first and second axis correction. The third module 1006 accepts the first and second axis corrections, as well as the star tracker measurements, to compute the compensated star tracker measurement.

The error correction module can be implemented in one or more hardware modules, or one or more software modules implemented by one or more processors. The processors may include special purpose processors, or may be the SCP 202 described herein. Further, while the foregoing is described with respect to measurements, computations and data describing a star position in two orthogonal axes, other paradigms for describing the star position may also be used, including embodiments in which the star position is described according to vector magnitude and direction, or other sufficiently orthogonal means to span the space of possible positions.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of processing a star tracker measurement to remove a systematic error characterizable at least in part by a pixel phase, comprising the steps of:

computing the pixel phase along a first axis from a measured star position and a star tracker characteristic;

computing a first axis error correction according to the computed pixel phase; and computing a compensated first axis star tracker measurement according to the measured star position and the first axis error correction.

2. The method of claim 1, wherein:

the star tracker comprises a plurality of pixels; and the star tracker characteristic is an angular extent of a pixel along the first axis.

3. The method of claim 2, wherein the pixel phase is computed according to the relation:

$$\phi_x = \frac{x_{meas}}{d_x} - rnd\left(\frac{x_{meas}}{d_x}\right),$$

wherein $x_{meas}$ is the measured star position, $d_x$ is the angular extent of a pixel along the first axis, and rnd(•) is a function that rounds up the value of (•) to the nearest integer.

4. The method of claim 3, wherein the systematic error is periodic.

5. The method of claim 4, wherein the systematic error is further characterizable by an amplitude, and the step of computing a first axis error correction according to the computed pixel phase comprises the step of computing a first axis error correction according to the computed pixel phase and the amplitude.

6. The method of claim 5, wherein the first axis error correction is computed according to the relation $$x_{correction} = a_x \sin(2\pi\phi_x)\phi_x$$

is an x-pixel phasing, and $a_x$ is an amplitude in an x-axis.

7. The method of claim 6, wherein the value of $a_x$ is a function of star magnitude.

8. The method of claim 3, wherein:

the pixel phase is further computed along a second axis from the measured star position and the star tracker characteristic;

computing a second axis error correction according to the computed pixel phase according to the relation $$\phi_y = \frac{y_{meas}}{d_y} - rnd\left(\frac{y_{meas}}{d_y}\right)$$

wherein $y_{meas}$ is the measured star position, $d_y$ is the angular extent of a pixel along the second axis;

computing a compensated second axis star tracker measurement according to the measured star position and the second axis error correction.

9. The method of claim 8, wherein the systematic error is further characterizable by an amplitude, and the step of computing a second axis error correction according to the computed pixel phase comprises the step of computing a second axis error correction according to the computed pixel phase an the amplitude.

10. The method of claim 5, wherein the second axis error correction is computed according to the relation $$y_{correction} = a_y \sin(2\pi\phi_y),$$

wherein $\phi_y$ is an y-pixel phasing, and $a_y$ is an amplitude in an y-axis.

11. The method of claim 10, wherein the value of $a_y$ is a function of star magnitude.

12. A method of determining an inertial attitude of a spacecraft, comprising the steps of:
   measuring at least one star position;
   processing the measured star position to remove a systematic error characterizable at least in part by a pixel phase; and
   determining the inertial attitude of the spacecraft at least in part from the processed star tracker measurements.

13. The method of claim 12, wherein the step of processing the measured star position comprises the steps of:
   computing a pixel phase along a first axis from a measured star position and a star tracker characteristic;
   computing a first axis error correction according to the computed pixel phase; and
   computing a compensated first axis star tracker measurement according to the measured star position and the first axis error correction.

14. The method of claim 13, wherein:
   the star tracker comprises a plurality of pixels; and
   the star tracker characteristic is an angular extent of a pixel along the first axis.

15. The method of claim 14, wherein the pixel phase is computed according to the relation:

$$\phi_x = \frac{x_{meas}}{d_x} - rnd\left(\frac{x_{meas}}{d_x}\right),$$

wherein $x_{meas}$ is the measured star position, $d_x$ is the angular extent of a pixel along the first axis, and rnd(•) is a function that rounds up the value of (•) to the nearest integer.

16. The method of claim 15, wherein the systematic error is periodic.

17. The method of claim 16, wherein the systematic error is further characterizable by an amplitude, and the step of computing a first axis error correction according to the computed pixel phase comprises the step of computing a first axis error correction according to the computed pixel phase and the amplitude.

18. The method of claim 17, wherein the first axis error correction is computed according to the relation:

$$x_{correction} = a_x \sin(2\pi\phi_x),$$

wherein $\phi_x$ is an x-pixel phasing, and $a_x$ is an amplitude in an x-axis.

19. The method of claim 18, wherein the value of $a_x$ is a function of star magnitude.

20. An apparatus for processing a star tracker measurement to remove a systematic error characterizable at least in part by a pixel phase, comprising:
   means for computing the pixel phase along a first axis from a measured star position and a star tracker characteristic;
   means for computing a first axis error correction according to the computed pixel phase; and
   means for computing a compensated first axis star tracker measurement according to the measured star position and the first axis error correction.

21. The apparatus of claim 20, wherein:
   the star tracker comprises a plurality of pixels; and
   the star tracker characteristic is an angular extent of a pixel along the first axis.

22. The apparatus of claim 21, wherein the pixel phase is computed according to the relation:

$$\phi_x = \frac{x_{meas}}{d_x} - rnd\left(\frac{x_{meas}}{d_x}\right),$$

wherein $x_{meas}$ is the measured star position, $d_x$ is angular extent of a pixel along the first axis, and rnd(•) is a function that rounds up value of (•) to the nearest integer.

23. The apparatus of claim 22, wherein the systematic error is periodic.

24. The apparatus of claim 23, wherein the systematic error is further characterizable by an amplitude, and the means for computing a first axis error correction according to the computed pixel phase comprises means for computing a first axis error correction according to the computed pixel phase and the amplitude.

25. The apparatus of claim 24, wherein the first axis error correction is computed according to the relation $$x_{correction} = a_x \sin(2\pi\phi_x),$$

wherein $\phi_x$ is an x-pixel phasing, and $a_x$ is an amplitude in an x-axis.

26. An apparatus for processing a star tracker measurement to remove a systematic error characterizable at least in part by a pixel phase, comprising:
   a first module, communicatively coupled to a star tracker, the first module configured to compute the pixel phase along a first axis from a measured star position and a star tracker characteristic;
   a second module communicatively coupled to the first module, the second module configured to compute a first axis error correction according to the computed pixel phase; and
   a third module communicatively coupled to the second module, the third module configured to compute a compensated first axis star tracker measurement according to the measured star position and the first axis error correction.

27. The apparatus of claim 26, wherein:
   the star tracker comprises a plurality of pixels; and
   the star tracker characteristic is an angular extent of a pixel along the first axis.

28. The apparatus of claim 27, wherein the pixel phase is computed according to the relation:

$$\phi_x = \frac{x_{meas}}{d_x} - rnd\left(\frac{x_{meas}}{d_x}\right),$$

wherein $x_{meas}$ is the measured star position, $d_x$ is the angular extent of a pixel along the first axis, and rnd(•) is a function that rounds up the value of (•) to the nearest integer.

29. The apparatus of claim 28, wherein the systematic error is periodic.

30. The apparatus of claim 29, wherein the systematic error is further characterizable by an amplitude, and the second module computes the first axis error correction according to the computed pixel phase and the amplitude.

31. The apparatus of claim 30, wherein the first axis error correction is computed according to the relation $$x_{correction} = a_x \sin(2\pi\phi_x),$$

wherein $\phi_x$ is an x-pixel phasing, and $a_x$ is an amplitude in an x-axis.

32. The apparatus of claim 31, wherein the value of $a_x$ is a function of star magnitude.

33. The apparatus of claim 26, wherein the first module, the second module, and the third module are implemented in at least one processor communicatively coupled to a memory.

* * * * *